Patented Nov. 1, 1932

1,885,179

UNITED STATES PATENT OFFICE

HEINRICH BURGER, OF BERLIN-CHARLOTTENBURG, GERMANY

IMPREGNATING LEATHER

No Drawing. Application filed September 22, 1931, Serial No. 564,459, and in Germany December 30, 1925.

My invention relates to the art of treating leather and more particularly to methods of improving the mechanical properties of tanned leather by impregnation.

It is an object of my invention to provide an improved impregnating method resulting in a final product which is waterproof, has excellent mechanical properties and is odourless.

Other objects of my invention will appear from the following description:

It has already been proposed to harden tanned leather by impregnating it with naphthalene. A similar method consists in impregnating the leather with naphthalene in which certain other impregnating agents and/or fillers, such as for instance elementary sulfur, are dissolved.

The use of naphthalene involves considerable drawbacks. This substance, when solidifying within the pores of the leather, exerts an unfavourable influence on the fibres and the texture of the leather, which is obviously due to the formation of naphthalene crystals. The product thus obtained shows little or no elasticity.

Another drawback is due to the fact that naphthalene, though being a solid body, exerts a distinct vapour pressure even at normal temperature. It sublimates out of the pores of the leather, forms on its surface a grey and highly undesirable layer and partly evaporizes, so that both the weight and the mechanical resistivity of the stored product are continuously reduced.

Moreover, the intense bad odour of naphthalene renders leather impregnated therewith undesirable for various purposes, no means being known for deodorizing it.

The same drawbacks are encountered and partly even increased when using a solution of sulfur in naphthalene.

In the course of my investigations I have ascertained that substantially all these drawbacks can be overcome by impregnating the tanned leather with a fluid homogeneous mixture of elementary sulfur and a volatile organic compound which compound is liquid at ordinary room temperature and has a boiling point of about 100° C. or above.

Molten sulfur as such cannot be used for impregnating leather, because it can hardly be kept at a fluidity sufficient to readily penetrate the pores of the leather, nor yields an improved product. I have found however that by adding to sulfur certain organic compounds of the kind aforesaid, homogeneous liquors containing elementary sulfur can be obtained or maintained even at a temperature below the melting point of sulfur, such for instance at temperatures of about 100° C.

Good results have been obtained with hydrocarbons answering the conditions set out above, such as for instance with xylene, with halogenated aliphatic or aromatic hydrocarbons, such as acetylene tetrachloride $CHCl_2.CHCl_2$, monochloro-benzene $C_6H_5Cl$, dichloro-benzene $C_6H_4Cl_2$ and also with various hydroaromatic compounds such as tetrahydronaphthalene. In many cases mixtures of different compounds are advantageously used.

At temperatures of about 100° C. the mixtures used in accordance with my invention are comparatively similar to molten sulfur excepting the highly increased fluidity. On cooling the mixture partly solidifies under formation of solid sulfur which however seems to retain part of the organic compound, the rest of which separates out as a liquid phase. I therefore assume, that the mixtures in question are true solutions of sulfur in the organic compounds, but I do not wish to be bound to this explanation, since merely the actual properties of the mixtures, viz. the increased fluidity at temperatures below the melting point of sulfur are essential in carrying out my invention.

In order to obtain a complete and lasting impregnation the leather should be dried prior to impregnation to render it substantially free from water. The ordinary dryness (so-called air-dryness) is not sufficient to obtain the best results, because air-dried leather is partly destroyed when subjected to a temperature of about 100° C.; however, if the leather has been substantially freed from water by a careful drying operation, it can be subjected to such temperatures for a moderate period of time without any deterioration occurring.

In practicing my invention I first dry the tanned leather at a moderate temperature and preferably in vacuo to expel substantially all the water contents of the air-dry leather, whereupon I soak it in a solution of sulfur in a solvent of the kind aforesaid, the mixture being kept at a temperature of about 100° C. or more. After 1–15 minutes, when the leather is impregnated with the liquid to the desired extent, it is removed from the bath and, after cooling, treated with slightly heated air to vaporize the residual solvent which, as a rule is then substantially free from sulfur, since the solubility of sulfur in the various organic solvents is comparatively low at low temperatures. In consequence thereof substantially all the sulfur is retained in the leather, where it acts both as a hardening and filling agent.

The amount of sulfur retained in the leather can be controlled not only by regulating the duration of the soaking period, but also by regulating the relative amounts of sulfur and solvents of the impregnating mixture and the temperature at which it is used. I may for instance employ, at a temperature of 90° C., a liquor consisting of 70 parts chloro-benzene and 30 parts sulfur, or, at a temperature of 115° C., a liquor consisting of 10–20 parts chloro-benzene and 90–80 parts sulfur.

Example 1

In order to produce an improved sole leather I first dry the leather, which has previously been tanned and fleshed in the usual way, at atmospheric pressure or preferably in vacuo so as to obtain a product substantially free from water, whereupon I soak it in an impregnating bath heated to about 110° C., this bath consisting of a mixture of 100 kilograms sulfur and 30 kilograms tetrahydronaphthalene $C_{10}H_{12}$. After 1–5 minutes, the exact period of soaking depending on the desired intensity of impregnation, the leather is withdrawn from the bath, washed with warm water and dried at a slightly elevated, though moderate temperature. During the drying step the tetrahydronaphthalene evaporates substantially completely. The product obtained may be finished or further treated in the usual way.

Example 2

In order to produce an improved shoe leather, the hide tanned in the usual way is dried at atmospheric pressure or preferably in vacuo so as to render it practically free from water, whereupon it is soaked for a few minutes in an impregnating bath heated to about 100° C., which consists of a mixture of 100 kilograms sulfur and 40 kilograms chloro-benzene. On being withdrawn the leather is washed with warm water and dried at a slightly elevated temperature.

Example 3

In order to produce an improved saddler's leather the hide tanned in the usual way is soaked for a few minutes in an impregnating bath heated to about 110° C., consisting of a mixture of 100 kilograms sulfur and 30 kilograms xylene, whereupon it is washed with warm water and dried at a slightly elevated temperature, whereupon it may be finished and greased as usual in the manufacture of saddler's leather.

If a particularly strong and hard leather is desired, the relative amount of solvent should be reduced and the soaking temperature should be increased. In order to obtain a uniform impregnation it is advisable to continuously stir the impregnating bath during the soaking period.

The final product obtained in accordance with my invention is distinguished from similar products by an increased elasticity, by the absence of bad odour and by a high stability on storing, i. e. the leather is not subjected to changes of weight, strength, appearance and other physical or chemical properties.

Wherever the expressions "solution" and "solvent" are used in this specification and in the claims affixed thereto, they are intended to refer to the formation of a mixture which is homogeneous at operation temperatures irrespective of whether a true dissolution or any other phenomena should occur in reality.

Various changes may be made in the details disclosed in the foregoing specification without departing from the invention or sacrificing the advantages thereof.

In the claims affixed to this specification no selection of any particular modification of the invention is intended to the exclusion of other modifications thereof and the right to subsequently make claim to any modification not covered by these claims is expressly reserved.

I claim:—

1. The method of producing impregnated leather consisting in soaking the tanned leather at an elevated temperature in a liquor containing elementary sulfur and an organic volatile solvent liquid at ordinary room temperature and having a boiling point above 100° C.

2. The method of producing impregnated leather consisting in soaking the tanned leather at an elevated temperature in a liquor containing elementary surfur and an organic volatile hydrocarbon liquid at ordinary room temperature and having a boiling point above 100° C.

3. The method of producing impregnated leather consisting in soaking the tanned leather at an elevated temperature in a liquor containing elementary sulfur and xylene.

4. The method of producing impregnated leather consisting in soaking the tanned leather at an elevated temperature in a liquor containing elementary sulfur and a halogenated hydrocarbon liquid at ordinary room temperature and having a boiling point above 100° C.

5. The method of producing impregnated leather consisting in soaking the tanned leather at an elevated temperature in a liquor containing elementary sulfur and mono-chloro-benezene.

6. The method of producing impregnated leather consisting in soaking the tanned leather at an elevated temperature with an impregnating liquor containing elementary sulfur and a hydrogenated hydrocarbon liquid at ordinary room temperature and having a boiling point above 100° C.

7. The method of producing impregnated leather comprising drying the tanned leather to render it substantially free from water and thereafter soaking it at an elevated temperature in a liquor containing elementary sulfur and an organic volatile solvent liquid at ordinary room temperature and having a boiling point above 100° C.

8. The method of producing impregnated leather consisting in soaking the tanned leather at a temperature ranging between 90 and 115° C. in a liquor containing elementary sulfur and an organic volatile solvent liquid at ordinary room temperature and having a boiling point above 100° C.

9. The method of producing impregnated leather comprising drying the tanned leather to render it substantially free from water and thereafter soaking it at a temperature ranging between 90 and 115° C. with an impregnating liquor containing elementary sulfur and an organic volatile solvent liquid at ordinary room temperature and having a boiling point above 100° C.

10. The method of producing impregnated leather comprising drying the tanned leather to render it substantially free from water and thereafter soaking it at a temperature ranging between 90 and 115° C. with an impregnating liquor containing elementary sulfur and a hydrocarbon liquid at ordinary room temperature and having a boiling point above 100° C.

11. The method of producing impregnated leather comprising drying the tanned leather to render it substantially free from water and soaking it in an impregnating bath heated to about 100° C., said bath consisting of a mixture of 100 parts by weight of sulfur and 30 parts by weight of tetrahydronaphthalene.

12. The method of producing impregnated leather comprising drying the tanned leather to render it substantially free from water and soaking it in an impregnating bath heated to about 100° C., said bath consisting of a mixture of 100 parts by weight of sulfur and 40 parts by weight of chlorobenzene.

In testimony whereof I affix my signature.

HEINRICH BURGER.